United States Patent [19]

Phillips et al.

[11] 4,246,761

[45] Jan. 27, 1981

[54] ABSORPTION HEAT PUMP CONTROL SYSTEM

[75] Inventors: Benjamin A. Phillips, Benton Harbor; Gordon P. McFaul, St. Joseph, both of Mich.

[73] Assignee: Allied Chemical Corporation, Morris Township, Morris County, N.J.

[21] Appl. No.: 956,118

[22] Filed: Oct. 30, 1978

[51] Int. Cl.$^3$ ............................................. F25B 15/00
[52] U.S. Cl. ........................................ 62/148; 62/232
[58] Field of Search ......................... 62/148, 141, 232

[56] References Cited

U.S. PATENT DOCUMENTS

| | | | |
|---|---|---|---|
| 2,850,266 | 9/1958 | Merrick et al. | |
| 3,279,204 | 10/1966 | Palmatier | 62/104 |
| 3,527,060 | 9/1970 | Kruggel | 62/476 |
| 3,590,593 | 7/1971 | Miner | 62/148 |

*Primary Examiner*—William E. Wayner
*Attorney, Agent, or Firm*—Alan M. Doernberg; Jay P. Friedenson

[57] ABSTRACT

An electrical control system for an absorption heat pump capable of conditioning a space by cooling or heating including:

(a) a unit activation component 64a having an on and off position responsive to temperature in the space to be conditioned;

(b) a mode selection switch 64e having a heating mode position and a cooling mode position;

(c) safety switches 64c for sensing hazardous operating conditions;

(d) a timer device 60 which is activated by the unit activation component 64a and the safety switches 64c and which, after a predetermined period of activation, turns an output 64 to an on position;

(e) a first control circuit 68 for operating the outside fan 15a when the unit activation component 64a is in the on position;

(f) a second control circuit 69 for operating the solution pump 30 when the timer output 64 is in the on position;

(g) a third control circuit 70 for operating the second or chilled coolant pump 12p when the timer output 64 is in the on position;

(h) a fourth control circuit 71 and 71' for moving a valve 14 to a heating position when the mode selection switch 64e is in the heating position and for moving the valve 14 to a cooling position when the mode selection switch 64e is the cooling position; and (i) a fifth control circuit 72 for operating a heat source 42v associated with the heat pump generator 10 when the timer output 64 is in the on position, the unit activation component 64a is in the on position and the safety switches 64c sense no hazard. The dependence of some control circuits on the unit activation component and others on the timer output improves the safety and reliability of the heat pump.

30 Claims, 5 Drawing Figures

ABSORPTION HEAT PUMP CONTROL SYSTEM

BACKGROUND OF THE INVENTION

Electrical control circuits of various types are commonly used in air conditioning and heat pump systems of various types, including compression and absorption refrigeration systems. Such systems typically include various sensors or switches as inputs and controls for various valves and pumps as outputs. In an absorption system the controlled functions are typically the solution pump, one or more coolant pumps or fans and a heat source associated with the generator such as a gas burner and ignition device.

The control system described in U.S. Pat. Nos. 3,527,060 and 3,527,061, issued Sept. 8, 1970 to Kruggel, includes a thermal time delay responsive to a thermostat which, after a delay, starts water coolant pumps, a diaphragm solution pump, a fan associated with an outside coil, and a gas burner. The delay, although inherent in the system, serves no useful purpose. When the thermostat senses no further demand, the gas burner is shut off and, after a delay attributable to the same thermal timer, the remaining power components are shut down. Several additional safety and control switches are also provided.

Such a timed system utilizes some of the refrigeration capacity or heating capacity of the system after gas burner shut off. The delay prior to unit activation serves no useful purpose, however, with all of the power components coming on at once.

Furthermore, since the gas flame is normally ventilated by the same fan that draws outside air over the outside coil, the gas supply and the fan come on at the same time. Since the absorption fluids may include a flammable component such as ammonia or ethyl tetrahydrofurfuryl ether, a flame started before activation of the fan to ventilate the apparatus has the potential of starting an uncontrolled fire.

CROSS-REFERENCE TO RELATED APPLICATIONS

This application describes control of an absorption heat pump system which may be one of the absorption systems described in whole or in part in the following copending United States Patent Applications of Benjamin A. Phillips.

Ser. No. 796,084, now U.S. Pat. No. 4,127,009 filed May 12, 1977, "Improved Absorption Heat Pump Absorber Unit and Absorption Method";

Ser. No. 796,493, now U.S. Pat. No. 4,127,993 filed May 12, 1977, "Method and Generator Unit Of An Absorption Heat Pump System For Separating A Rich Liquor Into A Refrigerant And A Solution Low In Regrigerant Coolant;"

Ser. No. 796,631, now U.S. Pat. No. 4,106,309 filed May 13, 1977, "Analyzer and Rectifier Method and Apparatus For Absorption Heat Pump"; and Ser. No. 796,773, now U.S. Pat. No. 4,127,010 "Improved Heat Activated Absorption Heat Pump Apparatus and Method".

BRIEF DESCRIPTION OF THE INVENTION

Figure 1:
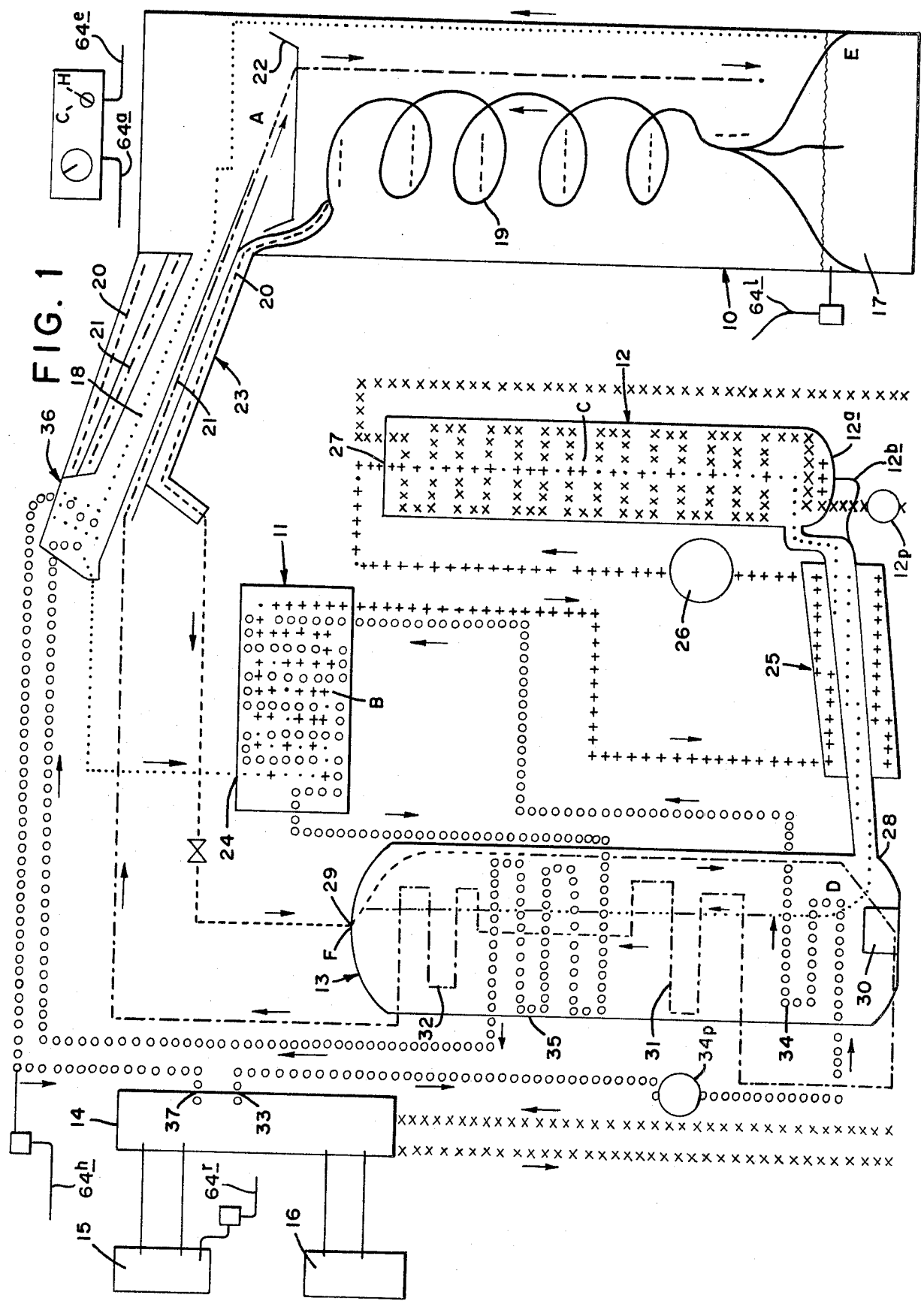
FIG. 1 is a schematic representation of an absorption heat pump system controlled by the control system of the present invention.

The present invention includes an improvement in an absorption heat pump control system whereby timer means are activated by a unit activation means and, after a predetermined period, turns an output to an on position. One control means operates the outside fan means when either the unit activation means or the time output is in the on position. Other control means operate the solution pumping means and the coolant pumping means when the timer means output is in the on position. Still other control means operate the heating means associated with the generator when both the unit activation means and the timer means output are in the on position. Thus, the outside fan means is operated for a first predetermined period before the heating means and other operative components are activated, and the heating means is deactivated a second predetermined period before the other operative components are deactivated.

More completely, the present invention is directed to an electrical control circuit for an absorption heat pump having a generator, heating means associated with the generator for imparting heat to the generator, a condenser, an evaporator, an absorber, solution pumping means for pumping solution from the absorber to the generator, a first coolant circuit in heat exchange relation with the absorber and condenser, a second coolant circuit in heat exchange relation with the evaporator, first coolant pumping means for circulating coolant through the first coolant circuit, second coolant pumping means for circulating coolant through the second coolant circuit, an ambient air heat exchanger, outside fan means for passing ambient air over the ambient air heat exchanger, an indoor heat exchanger and valve means for selectively interconnecting in a heating mode the first coolant circuit to the interior heat exchanger and the second coolant circuit to the ambient air heat exchanger, and for selectively interconnecting in a cooling mode the second coolant circuit to the interior heat exchanger and the first coolant circuit to the ambient heat exchanger. The electrical control circuit comprises:

(a) unit activation means having an on and off position responsive to interior temperature;

(b) mode selection means having a heating mode position and a cooling mode position;

(c) safety means for sensing hazardous operating conditions;

(d) timer means which is activated by the unit activation means being in the on position and the safety means sensing no hazardous operating conditions, and which, after a predetermined period of activation, turns an output to an on position;

(e) first control means for operating the outside fan means when the unit activation means is in the on position;

(f) second control means for operating the solution pumping means when the timer means output is in the on position;

(g) third control means for operating the second coolant pumping means when the timer means output is in the on position;

(h) fourth control means for moving the valve means to the heating position when the mode selection switch is in the heating position and for moving the valve means to the cooling position when the mode selection means is in the cooling position; and (i) fifth control means for operating the heating means associated with the generator when the timer means output is in the on position, the unit activation means is in the on position and the safety means senses no hazard.

In preferred forms, the various control means include semiconductor logic circuits with inputs in a low voltage circuit and with outputs to high voltage circuits controlling the operating units.

The present invention also includes heating-only heat pumps and cooling-only air conditioners having a lesser number of operating components and the first, second and fifth controls means only with appropriate modifications to accommodate the simplified operating structure.

DETAILED DESCRIPTION OF THE INVENTION

Figure 1A:
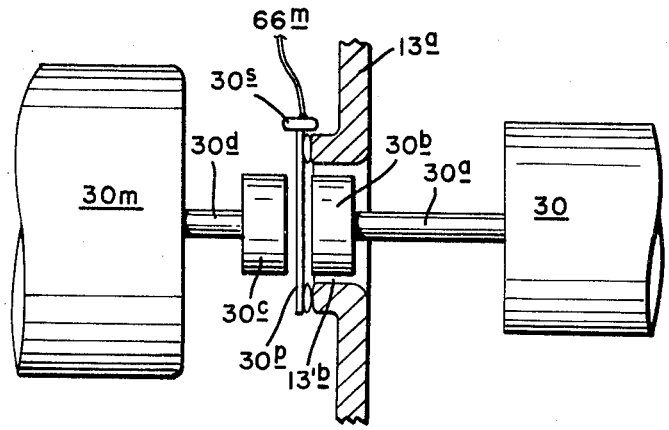
FIG. 1A is an enlarged elevational view of the lower portion of the absorber unit in FIG. 1.

The present invention is directed to electrical control of an absorption heat pump apparatus. Such apparatus includes a generator with heating means associated therewith for imparting heat to the generator so as to drive a refrigerant vapor at high pressure from an absorbent solution rich in refrigerant at high pressure. The refrigerant passes through a condenser, where it is condensed at high pressure, through an evaporator, where it is evaporated at low pressure, to an absorber. In the absorber, the refrigerant is redissolved or absorbed into an absorbent solution weak in refrigerant at low pressure to reform the rich solution. The rich solution is then pumped by a solution pump back to the generator to complete the cycle. An exemplary system, capable of operating in both heating and cooling modes, is illustrated in FIGS. 1 and 1A and in the above-referenced applications.

Thus one necessary operating function to be controlled is a heating means associated with the generator. The heating means may be a source of hot fluid such as steam or solar hot fluid in some absorption apparatus, but is often a gas or oil flame in some absorption systems controlled by the control system of the present invention. It includes, generally, a fuel supply line with an appropriate on-off or variable flow valve, an ignition system and a burner proper positioned to direct a flame at the portion of the generator to be heated or at fins or the like which transfer heat into the generator.

Another necessary operating feature is a solution pumping means to pump rich solution from low pressure in the absorber to high pressure in the generator. A pump may be located within the absorber housing or outside the absorber along a conduit between the absorber and the generator. Also included is drive means therebetween including, for example, a motor drive shaft driving the pump directly or through a magnetic coupling through the absorber wall. The rich liquor may flow in one or more heat exchange paths, such as through an absorber heat exchanger, a triple heat exchanger or a liquid heat exchanger.

The heat available from the absorber and condenser can be used for heating, while the refrigeration effect in the evaporator can be used for cooling. Thus, a first, heated coolant circuit is generally provided in heat exchange relation with the absorber and condenser. The ordering of flow of the first coolant pathway is not critical to the present invention. A second, chilled coolant circuit is generally provided in heat exchange relation with the evaporator. Coolant pumping means are provided, preferably one pump in each circuit, to circulate a coolant such as ethylene glycol-water through each circuit. The respective pumps may be driven by separate electrical motors or the like or by a single electrical motor or the like. The term "pumping means" is thus used herein to include, for example, a pump, an electrical motor and the driving connection therebetween.

The present invention is directed to absorption systems for cooling or heating or both. Systems capable of operating in both modes have coolant circuits for both withdrawing heat from the absorber and condenser and releasing heat to the evaporator. It is preferred that these two circuits be connectable to an interior heat exchanger with the heated coolant circuit being so connected in a heating mode and the chilled coolant circuit being so connected in a cooling mode. The circuit not so connected is connected to an outdoor ambient air heat exchanger. The operative means for so connecting said circuits will be described herein as "valve means". Such means are illustrated in above-referenced application Ser. No. 796,773 as including an eight way valve, but may also include similar valve arrangements such as four three-way valves or the two four-way valves shown in the Kruggel patents. Also included in the "valve means" is means to drive the valve or valves proper from a heating mode position to a cooling mode position and back. The valve may be normally fixed in one position by a spring or the like and driven to the other position only when positive force is applied by an electric valve motor or the like. Alternatively, the valve may be driven each way by two motors or one reversible motor or one motor with reversible driving means connected to the valve. In some preferred forms a reversible motor drives the valve to a stop in either of the two positions and stalls in that position so long as it is activated.

The ambient air heat exchanger enables heat to be rejected from the working fluids through the heated or first coolant circuit in the cooling mode and enables heat to be taken up by the chilled water circuit in the heating mode. Outside fan means which may be any blower or air impeller directs ambient air over the ambient air heat exchanger. It is common to locate such outside fan means so as to draw air from around the ambient air heat exchanger and also to draw air from adjacent the generator so as to pull combustion products from the burner in heat exchange relation with the generator. It is preferred for the present invention that such a combined function outide fan means be present. Typically, the outside fan means includes an electrical motor controlled in an on-off manner, but multi-speed control or variable control are also contemplated.

The absorption system includes several safety sensors or switches capable of sensing hazardous conditions. It is desirable to shut the system down in response to certain hazards such as generator overheating, fluid leakage and either flame back out or draft sensor indicative of obstruction in the flue gas pathway. Other hazards such as decoupling of the magnetic drive associated with the solution pumping means may only require stopping and restarting the solution pumping means without shutting down the entire system. Still others such as non-ignition, typically an internal function of the burner, should only cause reignition and cause shutdown of the entire system only after repeated non-ignition.

A frost-sensing means is provided in preferred forms of the invention to initiate a special cycle in which heated coolant is directed to the ambient air heat exchanger with the outside fan means preferably shut off until frost has been removed. It may take the form of a sail switch, a photocouple, a frost build-up sensor, an air pressure differential sensor or other sensor. The frost sensing means may return the system to operation in the heating mode once defrosting is sensed to be completed, as by coolant leaving the ambient air heat exchanger being sensed as above a predetermined temperature, typically 32°–50° F. It may return the absorption system to full operation in the heating mode if frost is still detected after the heat capacity of the heated coolant circuit is used up before defrosting is complete, returning the system to the special defrosting cycle once heat capacity is again built up in the heated coolant circuit. The frost sensing means may in some forms turn the system off if complete blockage is sensed or if a set number of consecutive defrost cycles fail to remove the obstructing conditions. In preferred embodiments, the frost sensing means initiates the defrosting cycle only if obstructed conditions are sensed and both sufficient heat is sensed in the heated coolant and the unit is on (the latter may be determined by the position of the unit activation means, timer means output or both).

In this disclosure the term "safety means" includes only those safety sensors or switches intended to shut down operation completely. Examples are the generator overheating sensor and the flame back sensor. Other sensors are included to the extent that they respond to repeated non-ignition or frost-obstructed conditions after repeated defrost cycles by shutting the system off. Sensors which control only one means, such as the magnetic decoupling sensor, are not included in "safety means", but rather separately input into the electrical control system.

The electrical control system responds to unit activation means and mode selection means, typically parts of a house thermostat. Thus when the temperature in a space to be heated is detected to fall below a set temperature, the unit activation means can be considered to come on with the mode selection means in the heating position. When it reaches a set temperature, the unit activation means goes off. When the temperature in a space to be cooled rises above a set temperature, the unit activation means can be considered to come on with the mode selection means in the cooling mode. It will be appreciated that numerous devices exist to perform these functions and the present invention is not limited to any particular type.

The electrical control system of the present invention includes timer means. Such timer means may be of any conventional type such as bimetallic switch heated upon the unit activation means being in the on position and turning its output to an on position after a predetermined period. When the unit activation meas goes off, the bimetallic switch begins to cool and after a predetermined period of deactivation turns its output to an off position, thereby deactivating the first, second, third and optionally the fourth control means. Even more preferably the predetermined period of deactivation is independent of the predetermined period of activation. This may be accomplished by solid state timer circuits such as illustrated herein. Preferred means of operating such a circuit include a diode for unidirectional current charging of a capacitor through a resistance to a level where an output switch closes (goes to an on position) and another unidirectional diode which permits the capacitor to discharge across a resistance when the voltage from the unit activation means drops, discharging until a sufficiently low voltage is reached, whereupon the switch opens (goes to an off position). Each function may be independently varied by substituting fixed resistances or varying variable resistances. Other suitable timing means as known in the art may be used.

The first control means operates the outside fan means when the unit activation means is in the on position. It may also operate the fan when the unit activation means is in the off position but the timer means output is in the on position (as during a shut-down period when residual heat or refrigeration is being extracted). In those preferred forms where a frost sensing means is provided, the frost sensing means may turn the first control means off, regardless of its other inputs. This shut-off happens during the defrost cycle when frost-obstructed conditions are sensed, but only if sufficient heating capacity is sensed in the heated water circuit.

The second control means operates the solution pumping means when the timer output is in the on position. On normal start-up this will be after the predetermined period of activation. If a magnetic decoupling sensor is present associated with the magnetic drive of the solution pump (such as the magnetic drive illustrated in FIG. 1A), the second control means should turn the solution pumping means off for a short time when decoupling is sensed and then restart the solution pump when recoupling occurs if the timer means output is still on. In some preferred forms, the second control means also operates the first coolant pumping means to pump coolant through the absorber and condenser circuit when the solution is being pumped. Thus the coolant is pumped through the first coolant circuit only after the predetermined period of activation and continues to be pumped during any predetermined period of deactivation of the timer means.

The third control means operates the second coolant pumping means when the timer means output is on. Thus the coolant is pumped through the evaporator only after the predetermined activation period and continues to be pumped during any predetermined deactivation period of the timer means.

In some forms the second and third control means may be combined. In preferred forms having a special defrost cycle, however, the third control means preferably does not also operate the first coolant pumping means. By separating these two functions, it is possible for the first coolant pump to circulate hot coolant for defrosting while the second coolant pump is inactive. If no defrost system or a different defrost system is used, then the third control means may operate the first and second coolant pumping means and may also operate the solution pumping means, eliminating the second control means altogether.

The fourth control means moves the valve means to the heating position when the mode selection means is in the heating position and to the cooling position when the mode selection means is in the cooling position. This movement is accomplished via the valve drive motor or the like in both directions or in at least one direction. Reversing may be accomplished by means of a return spring or the like in the other direction. In simplest forms, the movement of the valve occurs whenever the mode selection means is changed. It is preferred, however, that this movement occur only if all or part of the apparatus is on. In some preferred forms the fourth control means operates only when the timer means output is on. In other preferred forms the fourth control means operates only when the unit activation means is on. It will be appreciated that, in the latter case, the valve can be moved during the predetermined activation period of the timer means. Thus the valve is turned while no coolant is being pumped therethrough, providing therefore a lower resistance to movement.

A fifth control means operates the heating means associated with the generator, such as the burner, when the timer means output is in the on position, the unit activation means is in the on position and the safety means senses no hazard. Accordingly, the heating means does not come on until after the predetermined cycle. But the heating means is immediately shut off when any of the controls designated "safety means" senses hazardous conditions. The fifth control means only activates the heating means when the unit activation means is also in the on position. This shuts off the heating means during the deactivation period of the timer means with the solution and coolant pumping means still operating.

In preferred forms, the contol system further includes a frost-sensing means having the functions described above. In response to a selected combination of signals which are preferably indicative of frost while operating in the heating mode and the presence of sufficient heat in the first coolant, the frost-sensing means accomplishes these functions by shutting off, regardless of other signals, the first, third and fifth control means. Also in response to the indicated conditions, the frost-sensing means causes the fourth control means to turn the valve means to the cooling position so that heated coolant from the first coolant circuit will be supplied to the outside ambient air heat exchanger.

Each of the control means may be electrical, electromechanical or electronic devices. It is preferred that each operating device be in a high voltage circuit and the unit activation means, mode selection means, safety means and timer means be in a low voltage circuit. The five control means then have control means inputs in the low voltage circuit and control means outputs to the operating components. Preferred control means inputs includes sensors and conditioner circuits. As illustrated in the preferred embodiment, each control means includes logic circuits responsive to a set combination of input signals (preferably conditioned signals) by sending or not sending a current. This current activates or deactivates the high voltage current to the controlled device, as by the lamp-photoresponsive component system shown in the preferred embodiment. Other systems may be used; but, preferably, each control means should have maximum reliability with maximum protection of any logic units in the low voltage circuit from the high voltage.

DESCRIPTION OF THE PREFERRED EMBODIMENTS

The following embodiment is intended to illustrate, but not limit, the present invention. Modifications may be made in the actual circuitry within the scope of the present invention. Furthermore, the illustrated embodiment includes elements used in an absorption system capable of operation in a heating or cooling mode. Control systems for heating only or cooling only may, as described after the description of the illustrated embodiment, omit certain illustrated portions.

In FIG. 1, a heat pump system is shown including a generator 10, a condenser 11, an evaporator 12 and an absorber 13. The details of construction and operation of this system are described in U.S. Application Ser. No. 796,773 of Benjamin A. Phillips, filed May 13, 1977, with various components described in applications of Benjamin A. Phillips Ser. No. 796,631 filed May 13, 1977 and Ser. Nos. 796,084 and 796,493, filed May 12, 1977. The operation of this absorption system includes rich liquor, shown as alternating dots and dashes, in pool 17 of generator 10 being heated by heating means 42 (not illustrated in FIG. 1) to vaporize refrigerant vapor (shown as a series of dots) such as refrigerant 21 or 133a out of generator 10 through refrigerant outlet passage 18. Weak liquor (shown as a series of dashes) passes from pool 17 through analyzer coil 19 out weak liquor outlet passage 20. The weak liquor is a solution of an absorbent such as ethyl tetrahydrofurfuryl ether (ETFE) having a relative low refrigerant content compared to the rich liquor.

From the generator 10, the vaporized refrigerant passes to condenser 11 where it enters at inlet 24 and passes in heat exchange relation with coolant of a first coolant circuit (shown as circles) so as, by point B, to be condensing into liquid refrigerant (shown as +'s). From the condenser 11, the liquid refrigerant passes through a precooler 25 and expansion means 26 to inlet 27 of evaporator 12. In evaporator 12 the refrigerant again vaporizes in heat exchange with coolant in a second coolant circuit (shown as x's) and passes out as vapor through precooler 25 to a vapor inlet 28 of absorber 13. Unevaporated refrigerant coolant in cup 12a drains through drain line 12b so as to effect some control of overall concentrations of refrigerant and system pressures in response to the completeness of evaportion.

Weak liquid from weak liquor outlet 20 of generator 10 passes through a restriction to inlet 29 of absorber 13 where it flows over rich liquor coils 31 and 32 and second coolant circuit coils 34 and 35 in heat exchange with rich liquor and coolant therein while absorbing refrigerant. At solution pump 30, the rich liquor has been reconstituted and is pumped through rich liquor coils 31 and 32 back through rich liquor inlet 21 of generator 10 to distributor plate 22, over analyzer coil 19 into pool 17. For a more complete description of the various components, the descriptions of preferred embodiments of above-referenced Ser. Nos. 796,084, 796,493, 796,631 and 796,773 are incorporated herein by reference.

Pumps 34p and 12p are provided in the first and second coolant pathways to pump coolant therethrough. Solution pump 30 is provided within absorber 13 to pump rich liquor, but may be provided other places in the rich liquor pathway. Eight-way valve 14 is connected to both coolant circuits so as to direct heated coolant returning from first coolant pathway through its outlet 37 to outside ambient air exchanger 15 in the cooling mode. Warm coolant then is returned for reheating through first coolant pathway inlet 33. In the heating mode, outlet 35 and inlet 37 are connected to the interior or house heat exchanger 16. Valve 14 similarly connects chilled coolant in the second coolant circuit to outside ambient air heat exchanger 15 in the heating mode and to the interior heat exchanger 16 in the cooling mode. A fan (not illustrated in FIG. 1 but shown as 15a in FIG. 4) draws air over exchanger 15 and commonly also from the flue of the heating means associated with the generator.

The drive for solution pump 30 is shown in FIG. 1A. A motor 30m drives a drive magnet 30c through a drive shaft 30d. The solution pump 30 is driven by a driven magnet 30b through a driven shaft 30a. Drive magnet 30c may drive driven magnet 30b directly through absorber wall 13a. When absorber wall 13a is of a poor material for magnetic drive such as aluminum, a plate 30p of stainless steel or the like is provided between magnets 30b and 30c. As illustrated, magnet 30b is in recess 13b' on the inside of the absorber wall 13a, but other configurations may be used, such as a recess for magnet 30c on the outside of absorber wall 13a (as shown in Ser. No. 796,084). The magnetic drive may also be through the lower portion of the side of the absorber, as shown herein, or through the bottom of the absorber, as shown in Ser. No. 796,084.

A magnetic decoupling sensor 30s is provided near the outside of steel plate 30p. When magnets 30b and 30c are coupled, magnetic flux lines will run directly therebetween and little flux will be sensed by sensor 30s. When decoupling occurs, like and unlike poles of magnets 30c and 30b will alternatively face each other causing alternating flux lines to extend outwardly, such that sensor 30s will sense an alternating flux and send a signal to point 66m (which is a signal input point of the electrical control system).

Figure 4:
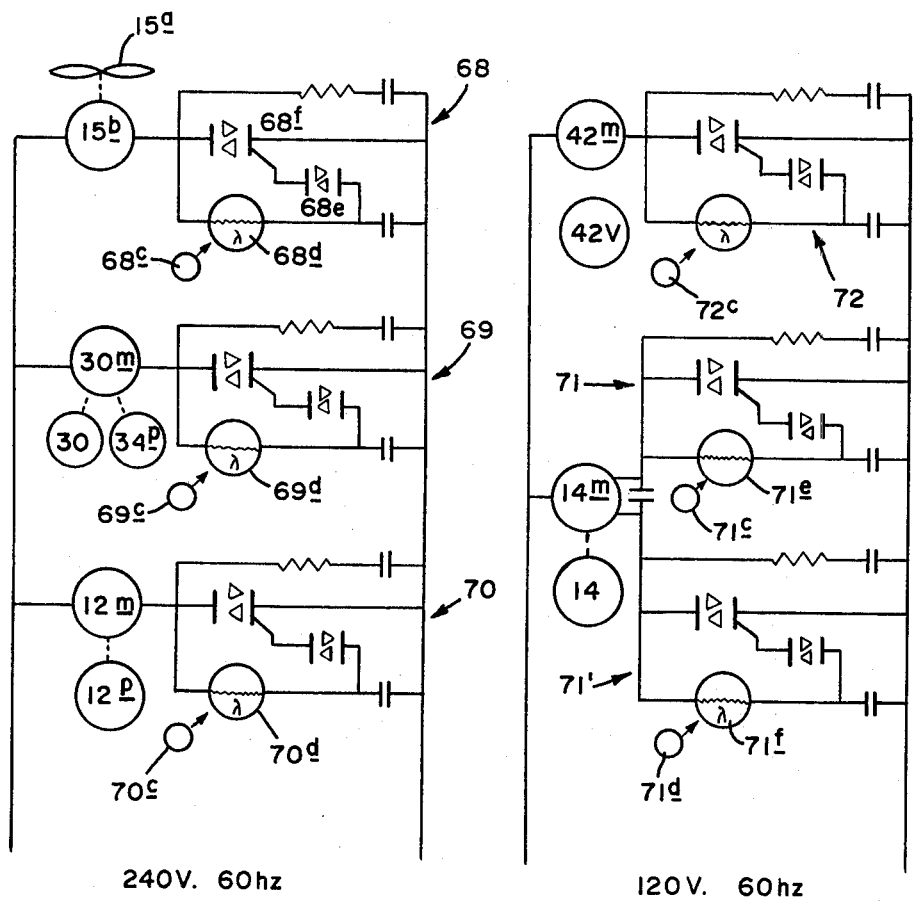
FIG. 4 is a schematic representation of the operating circuit portions of the control elements according to a preferred embodiment.

Thus the functions for the electrical control circuit to control include outside fan 15a, solution pump 30, coolant pump 34p associated with the heated coolant circuit, coolant pump 12p associated with the chilled coolant circuit, valve 14 and burner 42. The operative portions of the coolant pumps 34p and 12p could be one or two electric motors. A preferred form illustrated in FIG. 4 is to utilize one motor 30m to operate the solution pump 30 and the first coolant pump 34p. The second coolant pump 12p is operated by motor 12m.

Referring now to the lefthand portion of FIG. 2, a timer circuit 60 is shown with an input 61 which requires positive signals from the house thermostat (conditioned as described below) to point 66a and from safety switches (conditioned as described below) to point 66c. When heating or cooling are needed, direct current will flow through the diode 61a and resistance 62a to charge capacitor 63 to a low voltage such as five volts. Once a value such as four volts of charge has been attained, switch 64 will be closed via amplification circuit 65. This indicates that the timer means output is on. When heating or cooling is no longer required or safety switches sense hazards, the voltage at point 61 drops to 0. Capacitor 63 then discharges through resistance 62b and diode 61b until the voltage across capacitor 63 drops to below 0.5 volts. This opens switch 64 via amplification circuit 65 thus turning the timer output to off. The periods of activation and deactivation can be controlled by varying resistors 62a and 62b as variable resistors or by substituting various fixed resistors. Following the output from switch 64 through conditioner circuit 66, it can be seen that the signal timer output on or timer output off is conditioned to a voltage at point 66b that is at a "high" value (such as 4 volts or above) when the timer output is on and a "low" value (such as below 1 volt) when the timer output is off.

Figure 2:
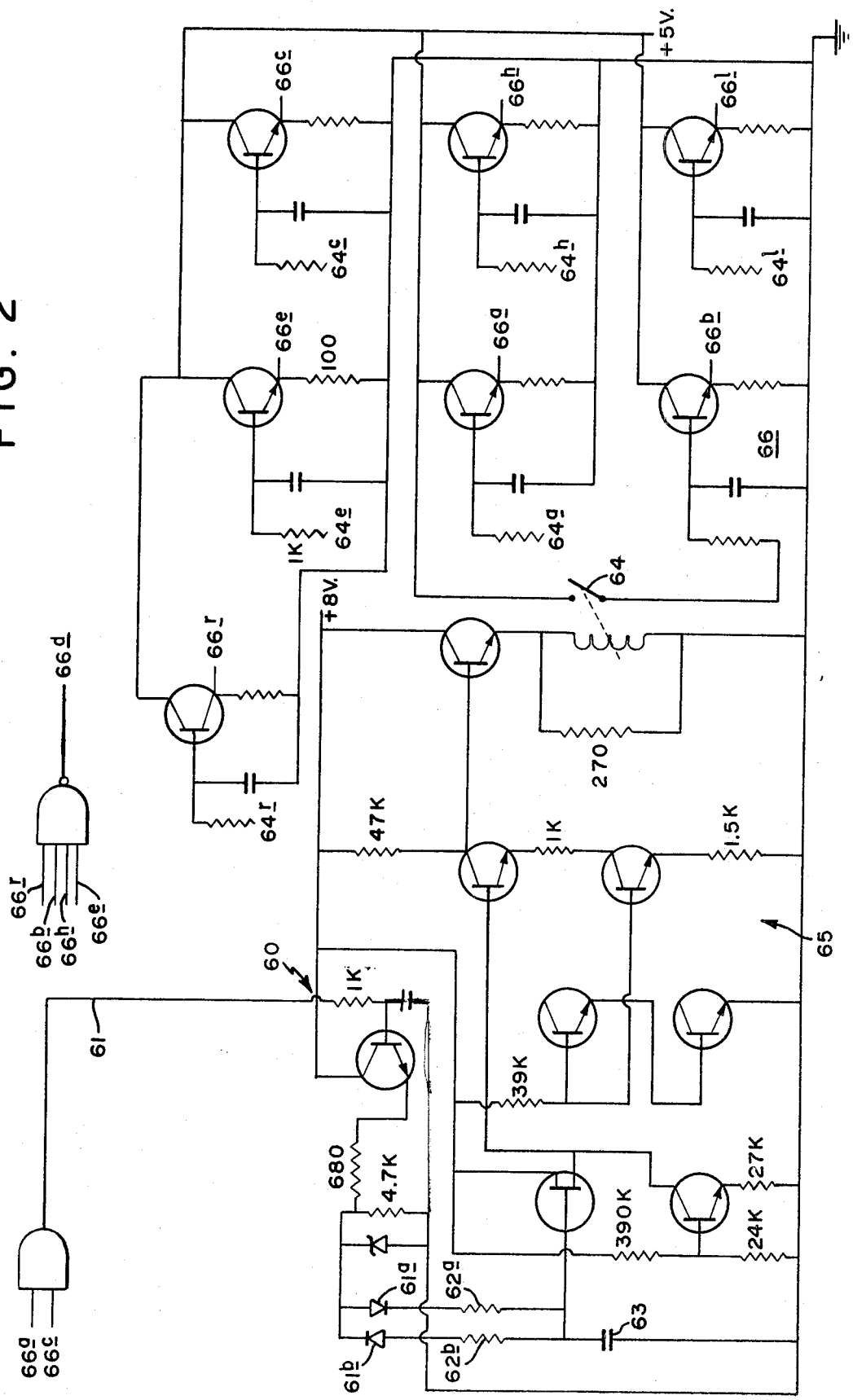
FIG. 2 is a schematic representation of the timer and signal conditioner portions of an absorption heat pump control circuit according to a preferred embodiment of the present invention.

The means for deriving the defrost signal is shown in the upper right of FIG. 2 to consist of a NAND logic element connected so as to remove a signal from point 66d when the following signals are received: 66r and 66h and 66b and 66e. 64r is a signal from a pressure differential sensor associated with outside coil 15. The signal on 66d is restored by the removal of any of the input signals 66r, 66h 66b or 66e.

Signal 64h is a sensor in the first coolant circuit which senses sufficient hot coolant to carry out defrost. Signal 64l is from a level control which senses sufficient fluid in the generator 10.

In like manner to the conditioning of the output signal from switch 64 to point 66b, signals from six primary signals are conditioned as shown in the following table and in the right hand portion of FIG. 2:

| Primary Signal | Input | Conditioned Output |
| --- | --- | --- |
| Unit activation, 64a in FIG. 1 | 64a | 66a |
| Safety switches (not shown) | 64c | 66c |
| Load selection, 64e in FIG. 1 | 64e | 66e |
| Hot water sensor, 64h in FIG. 1 | 64h | 66h |
| Generator fluid sensor, 64l in FIG. 1 | 64l | 66l |
| Fost sensor, 64r in FIG. 1 | 64r | 66r |

The signal for magnetic decoupling 66m in FIG. 1A is not conditioned.

Figure 3:
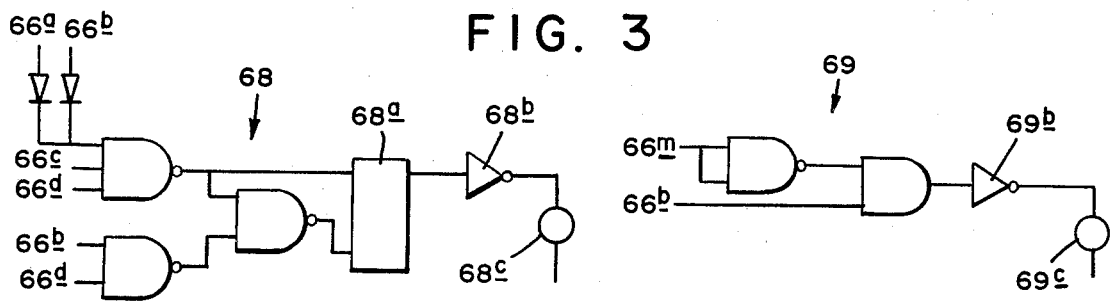
FIG. 3 is a schematic representation of the logic circuit portion of the control elements according to a preferred embodiment.
Figure 3:
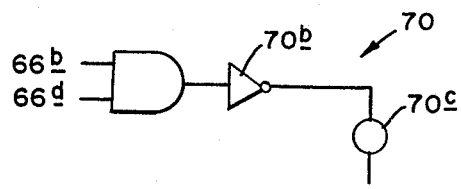
Figure 3:
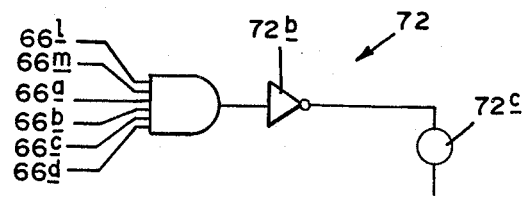
Figure 3:
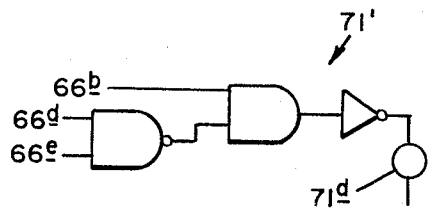
Figure 3:
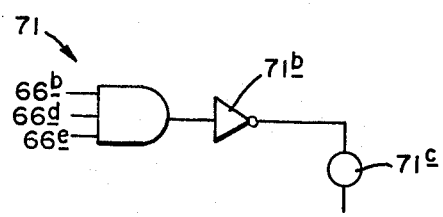

Referring now to FIG. 3, five control means are shown labeled 68, 69, 70, 71 and 72.

The first control means 68 includes one OR logic element, three NAND logic elements, one flipflop 68a and one drive element 68b in combination cascade, connected to light a lamp 68c. The inputs to these various elements are designated 66a, 66b, 66c and 66d to represent the corresponding points in FIG. 2. It will be appreciated that the lamp 68c will go on when on signals are received at (66a or 66b) and 66c and 66d.

The lamp 68c will be turned off when the following signals are received: NOT 66b or NOT 66d.

The second control means 69 includes a NAND logic element, an AND logic element and a drive element 69b connected in combination cascade to turn on lamp 69c when the timer means output 66b is on and the magnetic sensor 30s sends no signal to point 66m as described above in relation to FIG. 1A.

The third control means 70 includes one AND logic element and a drive element 70b in series to turn on lamp 70c when on signals are received from 66b and 66d indicating the timer output being on and the frost sensing means not initiating a defrost cycle.

The fourth control means is in two parts, the first of which, 71 controls the heating cycle and consisting of an AND logic element and a drive element 71b turning on lamp 71c when the following signals are received: 66b and 66d and 66e. The second part 71' of the fourth control means controls the cooling cycle and consists of one NAND logic element, one AND logic element and a drive element connected in combination cascade to turn on lamp 71d when the following signals are received: 66b and (NOT 66d or NOT 66e).

An equally preferred variation would be to substitute signal 66a for signal 66b in both first part 71 and second part 71'. The control for the fourth control means could also be varied to activate the valve motor when signal 66b is received and deactivated when signal 66a is received. It is also possible for the fourth control means to be activated only when a change in the valve setting is called for by the mode selection switch or defrost system and to become deactivated as soon as the valve has reached the new setting.

Similarly the fifth control means 72 includes an AND element and a drive element 72b cascade connected to turn on lamp 72c only when the following signals are received: 66a and 66b and 66c and 66d and 66l and NOT 66m.

Thus six outputs in the form of lamps 68c, 69c, 70c, 71c, 71d and 72c which are lit or unlit are controlled by six logic elements forming a part of control means, 68, 69, 70, 71, 71' and 72 of FIG. 3. It should be appreciated that the input signals for these six logic elements are all shown in FIG. 2 (conditioned signals 66a, 66b, 66c, 66e, 66l and 66r and derived signal 66d) or in FIG. 1A (signal 66m). The same six lamps are shown in FIG. 4 in relation to the portions of the operating units that they control. Thus the control means 68, 69, 70, 71, 71' and 72 each comprise a logic element as shown in FIG. 3 and operational connections as shown in FIG. 4 connected by a lamp shown in both figures. Lamp 68c is in proximity to photocell 68d which, upon lamp 68c going on, drops quickly in resistance activating the circuit so as to permit high voltage current (such as 120 or 240 volt alternating current) to pass through fan motor 15b activating fan 15a. The photocell 68d and lamp 68c act to shield the low voltage circuit from the high voltage and from any line interference. Thus first control means 68 controls fan 15a.

Similarly, lamp 69c causes photocell 69d to drop in resistance so as to supply high voltage current (such as 240 volt alternating current) to solution pump motor 30m driving solution pump 30 and first coolant pump 34p. Thus first control means 69 controls solution pump 30 and first coolant pump 34p.

Similarly, lamp 70c causes photocell 70d to drop in resistance so as to supply high voltage current (such as 120 or 240 volt alternating current) to the coolant pump motor 12m powering second coolant pump 12p. Thus third control means 70 controls second coolant pump 12p.

Similarly, lamp 71c causes photocell 71e to drop in resistance, acting to supply current to one set of leads of valve motor 14m to turn the valve to the heating position. Similarly lamp 71d causes photocell 71f to drop in resistance, acting to supply current to another set of leads of valve motor 14m to turn valve 14 to the cooling position. Thus portions 71 and 71' of the fourth control means control the valve means 14.

Similarly lamp 72c causes photocell 72d to drop in resistance actuating the supply of high voltage current (such as 120 or 240 volt alternating current) to gas valve control 42m, opening the valve 42v to supply gas to the burner 42. The same current will also activate ignition of the burner through a circuit which may be integral to the burner control. Thus fifth control means 72 controls the heating means.

The above-described embodiment may be modified to control a heat-only system or a cooling-only system. Referring to FIG. 1, a heat-only system would dispense with valve 14 so as to connect the first coolant pathway at points 33 and 37 directly to interior heat exchanger 16. The second coolant pathway (shown by x's) could be connected directly to ambient air heat exchanger 15, but would probably be eliminated by the conversion of evaporator 12 to a direct air-chilling evaporator. Thus the valve 14 and second coolant pump 12p would be eliminated, permitting the third and fourth control means to be eliminated and the second control means to control only the solution pump and first coolant. Fan 15a would draw air over an outside evaporator coil, and through the gas burner flue. The preferred defrost system described above would not be used since no valve means 14 would be present, but other defrosting systems for evaporating 12 could be provided such as a reversing valve in the refrigerant conduit, a bypass in the refrigerant circuit to introduce refrigerant vapor from outlet 18 directly into the evaporator, a hot or warm coolant bypass to heat refrigerant entering and leaving the evaporator, a hot or warm coolant bypass to heat the exterior of the evaporator coil or an electric resistance heater.

Even with such a heat-only system, first, second and fifth control means as described herein would be used, with the first control means activating the fan to draw air through the flue before the second and fifth control means activate the rest of the system.

A cooling-only system could use the above-described control system with certain modifications. The chilled or second coolant circuit would be directly connected between evaporator 12 and interior coil 16. Valve 14 and outside coil 15 would be eliminated. The heated water circuit including pump 34p would be eliminated. The absorber 13 and condenser 11 would then become air-cooled components with the fan 15a drawing air through the burner flue and over the absorber and condenser coils.

To control such a cooling-only system, the second control means could control both second coolant pump 12p and solution pump 30. Third and fourth control means would be eliminated. In such a system, activation of the unit means would start the fan 15a and initiate the timer activation cycle. Once the timer output was on, the second and fifth control means would start the remaining operating units. When the unit activation means went off, the fifth control means would shut off the burner and initiate a timer deactivation cycle. After deactivation, the first and second control means would shut off the fan and solution and chilled coolant pumps. No defrost system would be required.

The present invention is not limited to the above-described embodiments, but rather various additions, deletions or modifications may be made therein, beyond those discussed above, consistant with the spirit and scope of the invention as set forth in the claims that follow.

What is claimed is:

1. In an absorption heat pump having a generator, heating means associated with the generator for imparting heat to the generator, a condenser, an evaporator, an absorber, solution pumping means for pumping solution from the absorber to the generator, a first coolant circuit in heat exchange relation with the absorber and condenser, a second coolant circuit in heat exchange relation with the evaporator, first coolant pumping means for circulating coolant through the first coolant circuits, second coolant pumping means for circulating coolant through the second coolant circuit, an ambient air heat exchanger, outside fan means for passing ambient air over the ambient air heat exchanger, an indoor heat exchanger and valve means for selectively interconnecting in a heating mode the first coolant circuit to the indoor heat exchanger and the second coolant circuit to the ambient air heat exchanger, and for selectively interconnecting in a cooling mode the second coolant circuit to the indoor heat exchanger and the first coolant circuit to the ambient heat exchanger, an electrical control circuit which comprises:
(a) unit activation means having an on and an off position responsive to indoor temperature;
(b) mode selection means having a heating mode position and a cooling mode position;
(c) safety means for sensing hazardous operating conditions.
(d) timer means which is activated by the unit activation means being in the on position and the safety means sensing no hazardous operating conditions, and which after a predetermined period of activation turns an output to an on position;
(e) first control means for operating the outside fan means when the unit activation means is in the on position;
(f) second control means for operating the solution pumping means when said timer means output is in the on position;
(g) third control means for operating the second coolant pumping means when said timer means output is in the on position;
(h) fourth control means for moving the valve means to the heating position when said mode selection switch is in the heating position and for moving the valve means to the cooling position when said mode selection means is in the cooling position; and
(i) fifth control means for operating the heating means associated with the generator when said timer means output is in the on position, the unit activation means is in the on position and said safety means senses no hazard.

2. The absorption heat pump of claim 1 further comprising a frost sensing means associated with said ambient air heat exchanger for causing said fourth control means to move the valve means to the cooling position when frost-obstructed conditions are sensed by said frost-sensing means.

3. The absorption heat pump of claim 2 where said frost sensing means also causes said first control means to stop operation of said outside fan means and causes said third control means to stop operation of said control coolant pumping means when frost-obstructed conditions are sensed by said frost-sensing means.

4. The absorption heat pump of claim 3 wherein said frost sensing means also causes said fifth control means to stop activating said heating means when frost-obstructed conditions are sensed by said frost-sensing means.

5. The absorption heat pump of claim 2 wherein said second control means operates said first coolant pumping means and said solution pumping means when said timer means output is on.

6. The absorption heat pump of claim 2 wherein said frost sensing means causes said fourth control means to move the valve means only when temperature above a set temperature is sensed in the first coolant circuit.

7. The absorption heat pump of claim 1 wherein said second control means also operates the first coolant pumping means when said timer means output is in the on position.

8. The absorption heat pump of claim 1 wherein said fifth control means and said timer means are deactivated by said unit activation means being in the off position, and said timer means, after a predetermined period of deactivation, turns its output to an off position, thereby deactivating said first control means, said second control means, said third control means and said fourth control means.

9. The absorption heat pump of claim 8 where said predetermined period of deactivation is independent of said predetermined period of activation.

10. The absorption heat pump of claim 9 where said timer means comprises a capacitor with a charging connection across one resistance and a discharging connection across a second resistance, said timer means output being activated by the charging of the capacitor and deactivated by the discharging of the capacitor.

11. The absorption heat pump of claim 8 where said fourth control means moves said valve means only when said timer means output is in the on position.

12. The absorption heat pump of claim 8 where said fourth control means moves said valve means only when said unit activation means is in the on position.

13. The absorption heat pump of claim 1 wherein said fourth control means moves said valve means only when said timer means output is in the on position.

14. The absorption heat pump of claim 1 wherein said fourth control means moves said valve means only when said unit activation means is in the on position.

15. The absorption heat pump of claim 1 wherein said solution pumping means, said coolant pumping means, said outside fan means, said valve means and said heating means are in a high voltage circuit, and said unit activation means, mode selection means, safety means, timer means are in a low voltage circuit, and each of said first, second, third, fourth and fifth control means have a control means input in the low voltage circuit and a control means output to the high voltage circuit.

16. The absorption heat pump of claim 15 wherein each of said control means includes a logic circuit of semiconductor components.

17. The absorption heat pump of claim 16 wherein each of said control means includes a lamp responsive to the logic circuit and a photoresponsive component in the high voltage circuit adjacent the corresponding lamp.

18. The absorption heat pump of claim 16 wherein each control means includes inputs from at least one signal circuit and each signal circuit includes a conditioner element with an input from a sensor or switch.

19. The absorption heat pump of claim 1 wherein said valve means include a valve moving means with reversible drive and a valve having a heating and cooling position, said fourth control means causing said valve motor to drive said valve in the direction of its heating position when said mode selection switch is in its heating position and causing said valve motor to drive said valve in the direction of its cooling position when said mode selection switch is in its cooling position.

20. The absorption heat pump of claim 19 wherein said valve motor is activated when said unit activation means turns on and is deactivated when said timer means output turns off.

21. In an absorption heat pump system capable of heating a space having a generator, heating means associated with the generator for imparting heat to the generator, a condenser, an evaporator, an absorber, solution pumping means for pumping solution from the absorber to the generator, a coolant circuit in heat exchange relation with the absorber and condenser, an interior heat exchanger in heat exchange relation with the space to be heated, coolant pumping means for circulating coolant through the coolant circuit and interior heat exchanger and fan means for passing ambient air through the heating means, an electrical control circuit which comprises:
(a) unit activation means having an on and an off position responsive to interior temperature;
(b) safety means for sensing hazardous operating conditions;
(c) timer means which is activated by the unit activation means being in the on position and the safety means sensing no hazardous operating conditions, and which after a predetermined period of activation turns an output to an on position;
(d) first control means for operating the fan means when the unit activation means is in the on position;
(e) second control means for operating the solution pumping means and coolant pumping means when said timer means output is in the on position; and
(f) fifth control means for activating the heating means associated with the generator when said unit activation means is in the on position, timer means output is in the on position and said safety means senses no hazard.

22. In an absorption air conditioner capable of cooling a space having a generator, heating means associated with the generator for imparting heat to the generator, a condenser, an evaporator, an absorber, solution pumping means for pumping solution from the absorber to the generator, a coolant circuit in heat exchange relation with the evaporator, coolant pumping means for circulating coolant through the coolant circuit, fan means for passing ambient air through the heating means and for passing air in heat exchange relation with the condenser and absorber and an interior heat exchanger in heat exchange relation with the space to be cooled;

an electrical control circuit which comprises:
(a) unit activation means having an on and an off position responsive to interior temperature;
(b) safety means for sensing hazardous operating conditions;
(c) timer means which is activated by the unit activation means being in the on position and the safety means sensing no hazardous operating conditions, and which after a predetermined period of activation turns an output to an on position;
(d) first control means for operating the fan means when the unit activation means is in the on position;
(e) second control means for operating the solution pumping means and the coolant pumping means when said timer means output is in the on position; and
(f) fifth control means for activating the heating means associated with the generator when said timer means output is in the on position, said unit activation means is in the on position and said safety means senses no hazard.

23. The absorption heat pump of claim 21 wherein said solution pumping means, said coolant pumping means, said outside fan means, said valve means and said heating means are in a high voltage circuit, and said unit activation means, mode selection means, safety means, timer means are in low voltage circuit, and each of said first, second and fifth control means have a control means input in the low voltage circuit and a control means output to the high voltage circuit.

24. The absorption heat pump of claim 23 wherein each of said control means includes a logic circuit of semiconductor components.

25. The absorption heat pump of claim 24 wherein each of said control means includes a lamp response to the logic circuit and a photoresponsive component in the high voltage circuit adjacent the corresponding lamp.

26. The absorption heat pump of claim 24 wherein each control means includes inputs from at least one signal circuit and each signal circuit includes a conditioner element with an input from a sensor or switch.

27. The absorption heat pump of claim 22 wherein said solution pumping means, said coolant pumping means, said outside fan means, said valve means and said heating means are in a high voltage circuit, and said unit activation means, mode selection means, safety means, timer means are in a low voltage circuit, and each of said first, second and fifth control means having a control means input in the low voltage circuit and a control means output to the high voltage circuit.

28. The absorption heat pump of claim 27 wherein each of said control means includes a logic circuit of semiconductor components.

29. The absorption heat pump of claim 28 wherein each of said control means includes a lamp responsive to the logic circuit and a photoresponsive component in the high voltage circuit adjacent the corresponding lamp.

30. The absorption heat pump of claim 28 wherein each control means includes inputs from at least one signal circuit and each signal circuit includes a conditioner element with an input from a sensor or switch.

* * * * *